(12) United States Patent
Sato et al.

(10) Patent No.: US 8,865,327 B2
(45) Date of Patent: Oct. 21, 2014

(54) PERPENDICULAR MAGNETIC DISC

(75) Inventors: Tokichiro Sato, Singapore (SG); Takenori Kajiwara, Singapore (SG)

(73) Assignee: WD Media (Singapore) Pte. Ltd., Singapore (SG)

( * ) Notice: Subject to any disclaimer, the term of this patent is extended or adjusted under 35 U.S.C. 154(b) by 192 days.

(21) Appl. No.: 13/048,139

(22) Filed: Mar. 15, 2011

(65) Prior Publication Data

US 2012/0070692 A1    Mar. 22, 2012

(30) Foreign Application Priority Data

Mar. 31, 2010  (JP) .................................. 2010-083980

(51) Int. Cl.
*G11B 5/66* (2006.01)
*G11B 5/73* (2006.01)

(52) U.S. Cl.
CPC .................................... *G11B 5/7325* (2013.01)
USPC ..................................................... 428/831.2

(58) Field of Classification Search
CPC ....... G11B 5/732; G11B 5/7325; G11B 5/738
USPC .................................. 428/831, 831.2; 360/135
See application file for complete search history.

(56) References Cited

U.S. PATENT DOCUMENTS

| 7,666,529 | B2 * | 2/2010 | Girt et al. .................... 428/828.1 |
| 7,875,373 | B2 * | 1/2011 | Hirayama et al. .......... 428/836.2 |
| 8,647,755 | B2 * | 2/2014 | Yamamoto et al. ............ 428/829 |
| 2010/0110588 | A1 * | 5/2010 | Arai et al. ...................... 360/135 |
| 2010/0232054 | A1 * | 9/2010 | Mabuchi et al. ................. 360/75 |
| 2011/0111262 | A1 * | 5/2011 | Umezawa et al. ............. 428/827 |
| 2012/0154948 | A1 * | 6/2012 | Tamai et al. ..................... 360/75 |

FOREIGN PATENT DOCUMENTS

| JP | 2007-179598 | 7/2007 |
| JP | 2008-123626 | 5/2008 |
| JP | 2008-276833 | 11/2008 |

OTHER PUBLICATIONS

Japanese Office Action dated Apr. 1, 2014 for related Japanese Application No. 2010-083980 5 pages.

\* cited by examiner

*Primary Examiner* — Holly Rickman

(57) ABSTRACT

A perpendicular magnetic disk that includes, on a base, a soft magnetic layer, an amorphous alloy layer, a preliminary ground layer provided on the amorphous alloy layer, a ground layer formed of Ru or a Ru-type alloy having an hcp crystal structure provided on the preliminary ground layer. A granular magnetic layer is provided on the ground layer. The amorphous alloy layer contains Ta, and the preliminary ground layer includes a first preliminary ground layer formed of Ti or a Ti alloy of microcrystals and a second preliminary ground layer formed of a Ni-type alloy of an fcc crystal structure.

10 Claims, 3 Drawing Sheets

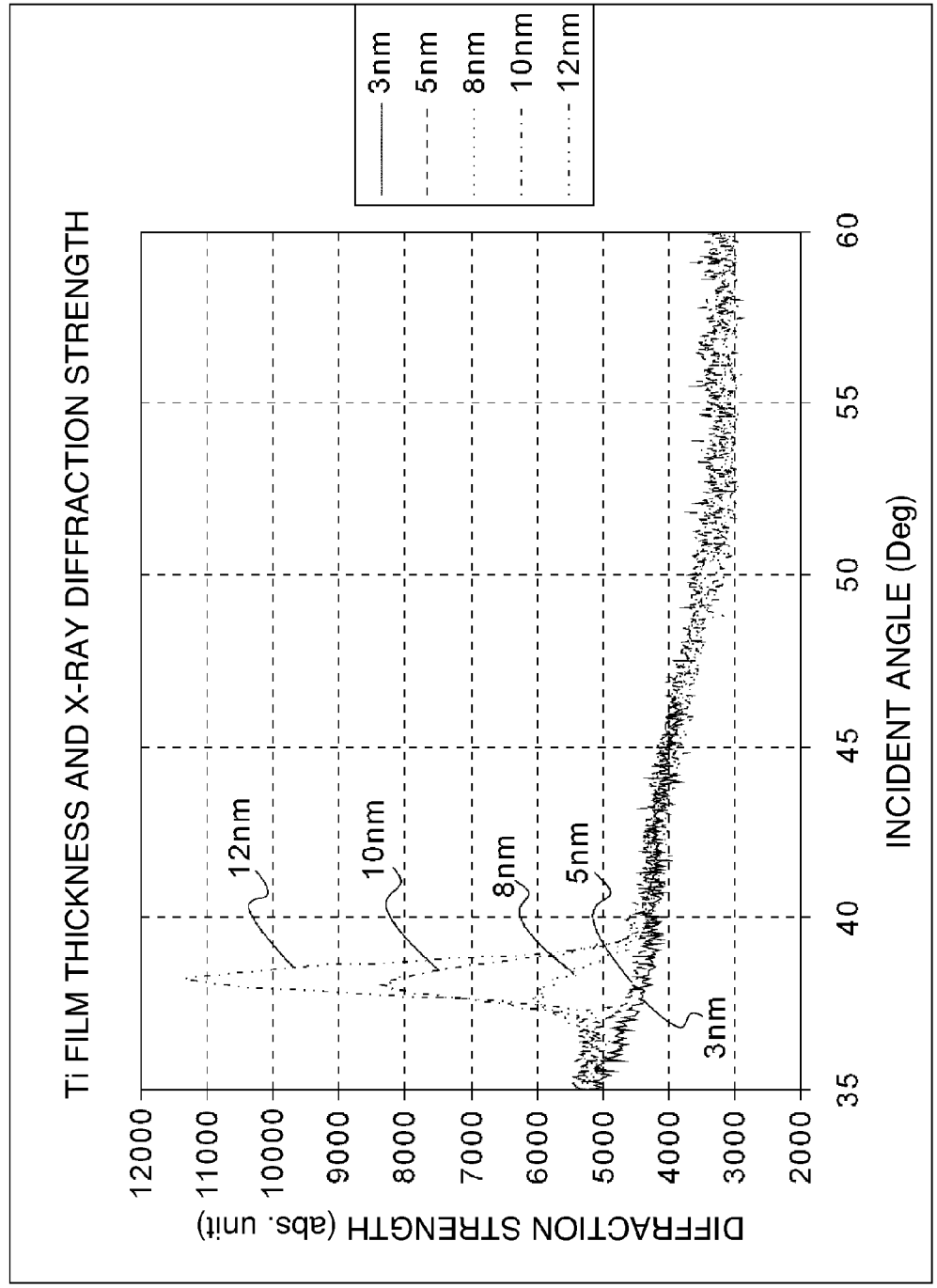

FIG. 3

| | AMORPHOUS ALLOY LAYER | | FIRST PRELIMINARY GROUND LAYER | | Δθ50 (Ru002) [deg] | SNR [dB] |
|---|---|---|---|---|---|---|
| | COMPOSITION | FILM THICKNESS [nm] | COMPOSITION | FILM THICKNESS [nm] | | |
| COMPARATIVE EXAMPLE 3 | Ni-50Ta | 2 | Ti | 0 | 2.5 | 15.4 |
| EXAMPLE 1-1 | Ni-50Ta | 2 | Ti | 1 | 2.3 | 15.8 |
| EXAMPLE 1-2 | Ni-50Ta | 2 | Ti | 3 | 2.2 | 15.9 |
| EXAMPLE 1-3 | Ni-50Ta | 2 | Ti | 4 | 2.2 | 15.9 |
| EXAMPLE 1-4 | Ni-50Ta | 2 | Ti | 5 | 2.2 | 15.7 |
| EXAMPLE 1-5 | Ni-50Ta | 2 | Ti | 6 | 2.1 | 15.1 |
| COMPARATIVE EXAMPLE 1-1 | Ni-50Ta | 2 | Co-40Cr-5Al | 1 | 3.6 | 15.2 |
| COMPARATIVE EXAMPLE 1-2 | Ni-50Ta | 2 | Co-40Cr-5Al | 3 | 4.2 | 14.9 |
| COMPARATIVE EXAMPLE 1-3 | Ni-50Ta | 2 | Co-40Cr-5Al | 5 | 4.8 | 14.7 |
| COMPARATIVE EXAMPLE 1-4 | Ni-50Ta | 2 | Co-40Cr-5Al | 6 | 5.0 | 14.4 |
| COMPARATIVE EXAMPLE 2-1 | Ni-50Ta | 2 | Co-40Cr-5Cu | 1 | 2.8 | 15.4 |
| COMPARATIVE EXAMPLE 2-2 | Ni-50Ta | 2 | Co-40Cr-5Cu | 3 | 3.1 | 15.3 |
| COMPARATIVE EXAMPLE 2-3 | Ni-50Ta | 2 | Co-40Cr-5Cu | 5 | 3.5 | 15.1 |
| COMPARATIVE EXAMPLE 2-4 | Ni-50Ta | 2 | Co-40Cr-5Cu | 6 | 4.0 | 14.8 |
| COMPARATIVE EXAMPLE 4 | Ni-50Ta | 0 | Ti | 4 | 2.6 | 15.2 |
| EXAMPLE 3 | Ni-50Ta | 4 | Ti | 4 | 2.2 | 15.8 |
| EXAMPLE 4 | Ni-50Ta | 8 | Ti | 4 | 2.1 | 15.7 |

PERPENDICULAR MAGNETIC DISC

TECHNICAL FIELD

The present invention relates to a perpendicular magnetic disk implemented on an HDD (hard disk drive) of a perpendicular magnetic recording type or the like, and its manufacturing method.

BACKGROUND ART

With an increase in capacity of information processing in recent years, various information recording technologies have been developed. In particular, the surface recording density of an HDD using magnetic recording technology is continuously increasing at an annual rate of approximately 60%. In recent years, an information recording capacity exceeding 320 Gbytes/platter for a magnetic recording medium with a 2.5-inch diameter for use in an HDD or the like has been desired. To fulfill such demands, an information recording density exceeding 500 Gbits per square inch is desired to be achieved.

Important factors to attain a high recording density of a perpendicular magnetic disk include an improvement in TPI (Tracks per Inch) by narrowing a track width, ensuring an electromagnetic conversion characteristic, such as a Signal to Noise Ratio (SNR) or an overwrite characteristic (an OW characteristic) at the time of improving BPI (Bits per Inch), and further ensuring a resistance to thermal fluctuation with the recording bit decreased with the cause described above. Among others, an improvement in SNR under a high recording density condition is important.

In a magnetic layer of a granular structure, which goes mainstream in recent years, a non-magnetic substance having an oxide as a main component is subjected to segregation around magnetic particles having a CoCrPt alloy grown in a columnar shape as a main component to form a grain boundary part. In this structure, since the magnetic particles are separated from each other, noise is reduced, which is effective in achieving a high SNR. An important factor to further improve the SNR is to improve crystal orientation. Co has an hcp structure (a hexagonal close-packed structure), and a c-axis direction (an axial direction of a hexagonal column of a crystal grating) serves as an easy axis of magnetization. Therefore, by orienting the c axis of more crystals in a more perpendicular direction, noise is reduced and also a signal is strengthened, thereby improving the SNR as a synergistic effect.

When a metal film of an hcp structure is formed by sputtering, crystal orientation tends to be improved as the film thickness is thicker. Thus, to improve the crystal orientation of a granular magnetic layer in an initial growth stage, in a conventional technique, Ru, which is a metal of an hcp structure, is used to form a ground layer (also called an intermediate layer), and a granular magnetic film is then formed thereon. Furthermore, a crystalline preliminary ground layer (also called a seed layer) is provided below the Ru ground layer to improve the crystal orientation of the Ru ground layer.

Patent Document 1 describes a structure in which a soft magnetic film configuring a backing layer has an amorphous structure, a ground film (corresponding to a preliminary ground layer in the present invention) is formed of a NiW alloy, and an intermediate film (corresponding to a ground layer in the present invention) is formed of a Ru alloy. According to Patent Document 1, with the ground film being formed of a NiW alloy and the intermediate film being formed of a Ru alloy, excellent productivity and recording and reproduction of high-density information can be achieved.

PRIOR ART DOCUMENT

Japanese Unexamined Patent Application Publication No. 2007-179598

SUMMARY OF THE INVENTION

Problems to be Solved by the Invention

To further increase recording density in the future, it is required to further improve crystal orientation of the magnetic particles and a ground layer, which is their foundation base and to improve an SNR.

Thus, an object of the present invention is to provide a perpendicular magnetic disk in which crystal orientation of a preliminary ground layer formed of a Ni-type alloy is further improved, thereby improving an SNR and increasing recording density.

Means for Solving the Problem

To solve the above problem, in a typical structure of the perpendicular magnetic disk according to the present invention, the perpendicular magnetic disk includes, on a base, an amorphous alloy layer, a preliminary ground layer provided on the amorphous alloy layer, a ground layer formed of Ru or a Ru-type alloy having an hcp crystal structure provided on the preliminary ground layer, and a granular magnetic layer provided on the ground layer, wherein the amorphous alloy layer contains Ta, and the preliminary ground layer includes a first preliminary ground layer formed of Ti or a Ti alloy of microcrystals and a second preliminary ground layer formed of a Ni-type alloy of an fcc crystal structure.

According to the structure above, an excellent amorphous property can be ensured by containing Ta in the amorphous alloy layer, and a film having a flat surface can be formed. Next, by forming a first preliminary ground layer made of microcrystals of Ti or a Ti alloy, a foundation base of a fine structure can be produced while high flatness is kept. At this time, since a thin film of Ti or a Ti alloy is formed on a Ta-contained film, the interface is not rugged unlike the case of laminating other elements, and therefore flatness can be kept.

Also, by forming a second preliminary ground layer of an fcc crystal structure, the flatness and fine structure formed with these two layers described above can be inherited, thereby obtaining a layer of an fcc crystal structure excellent in crystal orientation and fine structure. Here, the layer made of microcrystals of Ti can improve crystal orientation of a Ni-type alloy. With this, the ground orientation of magnetic particles of the crystal layer and the granular magnetic layer can be improved to improve the SNR.

The amorphous alloy layer preferably contains 30 at % or more Ta. With this, making the layer amorphous more effectively can be promoted, and the surface can be flattened.

The film thickness of the first preliminary ground layer is preferably equal to or larger than 1 nm and equal to or smaller than 5 nm. The reason for this can be such that the SNR has a peak between 1 nm to 5 nm of the film thickness of the first preliminary ground layer and therefore microcrystals are formed with this film thickness therebetween. The characteristic is not improved with less than 1 nm, and the reason for this can be such that the film is so thin that the first preliminary ground layer has an amorphous structure. The characteristic is degraded with the film thickness being thicker than 5 nm, and the reason for this can be such that Ti forms a hcp crystal structure and the crystal grains of the first preliminary ground layer containing Ti are overgrown, thereby overgrowing the particles of the ground layer and the granular magnetic layer.

Effect of the Invention

According to the present invention, flatness can be achieved with an amorphous alloy layer containing Ta and, next, with the first preliminary ground layer of microcrystals, the crystal orientation of the second preliminary ground layer having an fcc crystal structure can be improved. Furthermore, with the crystal orientation of magnetic particles being improved, the SNR can be improved.

BRIEF DESCRIPTION OF THE DRAWINGS

FIG. 2 is a drawing that depicts the film thickness of Ti and an X-ray diffraction strength.
FIG. 3 is a drawing that depicts a relation between the film thickness of a first preliminary ground layer and Δθ50 and SNR of a ground layer.

BEST MODES FOR CARRYING OUT THE INVENTION

Figure 1:
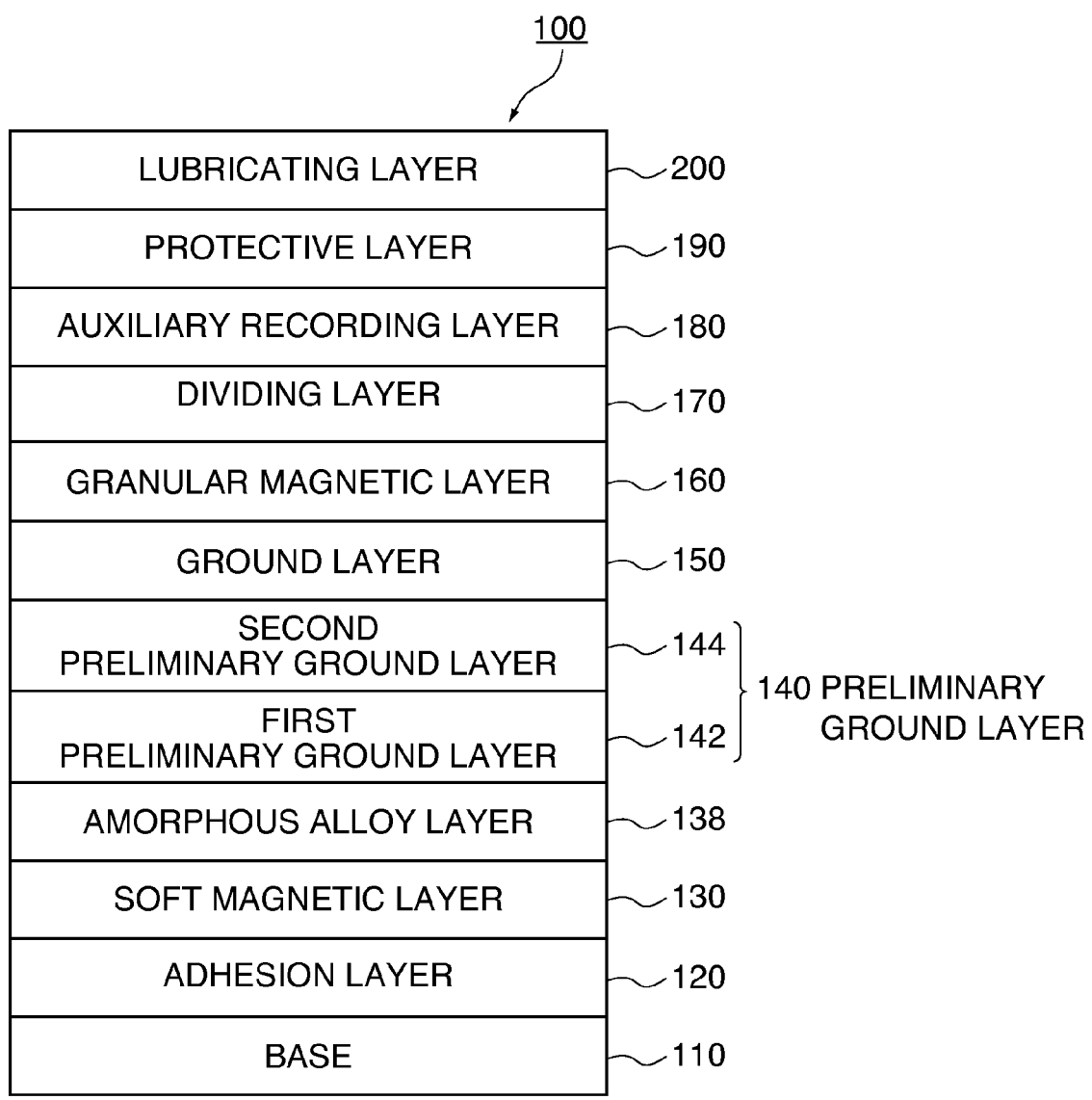
FIG. 1 is a drawing for describing the structure of a perpendicular magnetic disk.

In the following, with reference to the attached drawings, preferred embodiments of the present invention are described in detail. The dimensions, materials, and others such as specific numerical values shown in these embodiments are merely examples so as to facilitate understanding of the invention, and are not meant to restrict the present invention unless otherwise specified. Note that, in the specification and drawings, components having substantially the same functions and structures are provided with the same reference characters and are not redundantly described, and components not directly relating to the present invention are not shown in the drawings.

Perpendicular Magnetic Disk: FIG. 1 is a drawing for describing the structure of a perpendicular magnetic disk 100 according to a first embodiment. The perpendicular magnetic disk 100 depicted in FIG. 1 is configured of a base 110, an adhesion layer 120, a soft magnetic layer 130, an amorphous alloy layer 138, a preliminary ground layer 140 (including a first preliminary ground layer 142 and a second preliminary ground layer 144), a ground layer 150, a granular magnetic layer 160, a dividing layer 170, an auxiliary recording layer 180, a protective layer 190, and a lubricating layer 200.

For the base 110, a glass disk molded in a disk shape by direct-pressing amorphous aluminosilicate glass can be used. Note that the type, size, thickness, and others of the glass disk are not particularly restricted. A material of the glass disk can be, for example, aluminosilicate glass, soda lime glass, soda alumino silicate glass, aluminoborosilicate glass, borosilicate glass, quartz glass, chain silicate glass, or glass ceramic, such as crystallized glass. This glass disk is sequentially subjected to grinding, polishing, and chemical strengthening, thereby allowing the smooth, non-magnetic base 110 made of chemically-strengthened glass disk to be obtained.

On the base 110, the adhesion layer 120 to the auxiliary recording layer 180 are sequentially formed by DC magnetron sputtering, and the protective layer 190 can be formed by CVD. Then, the lubricating layer 200 can be formed by dip coating. In the following, the structure of each layer is described.

The adhesion layer 120 is formed in contact with the base 110, and includes a function of increasing a contact strength between the soft magnetic layer 130 formed thereon and the base 110. The adhesion layer 120 is preferably an amorphous alloy film, for example, a CrTi-type amorphous alloy, a CoW-type amorphous alloy, a CrW-type amorphous alloy, a CrTa-type amorphous alloy, or a CrNb-type amorphous alloy. The film thickness of the adhesion layer 120 can be on the order of 2 to 20 nm, for example. The adhesion layer 120 may be a single layer, or may be formed by laminating a plurality of layers.

The soft magnetic layer 130 operates to converge a write magnetic field from a head when a signal is recorded in a perpendicular magnetic recording type, thereby helping ease of writing the signal in a magnetic recording layer and increasing density. As a soft magnetic material, a material showing a soft magnetic characteristic can be used, for example, a cobalt-type alloy, such as CoTaZr; a FeCo-type alloy, such as FeCoCrB, FeCoTaZr, or FeCoNiTaZr; a NiFe-type alloy. Also, by interposing a spacer layer made of Ru nearly in the middle of the soft magnetic layer 130, the soft magnetic layer 130 can be configured to include Antiferromagnetic exchange coupling (AFC). With this, perpendicular components of magnetizing can be extremely lessened, thereby decreasing noise occurring from the soft magnetic layer 130. In the case of the structure with a spacer layer interposed, the soft magnetic layer 130 can have a film thickness such that the film thickness of the spacer layer is on the order of 0.3 to 0.9 nm and the film thickness of each of the soft magnetic layers above and below the spacer layer is on the order of 10 to 50 nm.

The amorphous alloy layer 138 contains Ta, and is a layer insuring flatness of the surface. Ta has a function of increasing an amorphous property, with which a film with an extremely flat surface can be formed. To ensure a high amorphous property of Ta, 30 at % or more of Ta is preferably contained. As a specific example, NiTa or CrTa can be used. Also, even when the first preliminary ground layer 142, which will be described next, is formed on the amorphous alloy layer 138 containing Ta, the interface is not rugged, and the flatness can be ensured.

The preliminary ground layer 140 is configured of a the first preliminary ground layer 142 and the second preliminary ground layer. The preliminary ground layer 140 includes a function of promoting crystal orientation of the ground layer 150 formed thereon and a function of controlling a fine structure, such as grain particles.

The first preliminary ground layer 142 has a microcrystal structure formed of Ti or a Ti alloy. The microcrystal structure is in a state of being formed of a collection of fine crystals. Whether the structure has become a microcrystal structure can be confirmed by the fact that a peak of diffraction line hardly appears when a measurement is performed by X-ray diffraction (XRD). As a Ti alloy, a higher ratio of Ti is preferable because of more easily forming microcrystals. Furthermore, Ti is preferable if unwanted impurities are removed.

With the first preliminary ground layer 142 being microcrystals, the crystal of the Ni-type alloy of the second preliminary ground layer 144 grows on the microcrystals of Ti, and therefore the crystal orientation of the second preliminary ground layer 144 can be improved. With this, the SNR can be improved. If the first preliminary ground layer 142 is amorphous, the second preliminary ground layer 144 starts crystal growth from nothing, and therefore a large film thickness is required to achieve an excellent fcc crystal orientation, which poses a concern of overgrown particles. By contrast, if the first preliminary ground layer 142 is crystalline, the second preliminary ground layer 144 tries to grow as inheriting the crystal structure, thereby causing a hindrance to lattice matching and possibly degrading crystal orientation.

The film thickness of the first preliminary ground layer is preferably equal to or larger than 1 nm and equal to or smaller than 5 nm. The reason for this can be such that the SNR has a peak between 1 nm to 5 nm of the film thickness of the first preliminary ground layer 142 and therefore microcrystals are formed with this film thickness therebetween. The characteristic is not improved with less than 1 nm, and the reason for this can be such that the film is so thin that the first preliminary ground layer 142 has an amorphous structure. The characteristic is degraded with the film thickness being thicker than 5 nm, and the reason for this can be such that Ti forms a crystal structure.

The second preliminary ground layer 144 is made of a Ni-type alloy of an fcc crystal structure (a face-centered cubic structure) with a (111) surface being parallel to a main surface of the base 110. As a material of the second preliminary ground layer 144, an alloy with Ni as a main component added with one or more of V, Cr, Mo, W, Ta, and others can be used. Specifically, a selection can be suitably made from NiV, NiCr, NiTa, NiW, NiVCr, and others. Note that the main component means a component contained most. The film thickness of the second preliminary ground layer 144 can be on the order of 1 to 20 nm.

The ground layer 150 has an hcp structure, includes a function of promoting crystal orientation of magnetic crystal grains of an hcp structure of the granular magnetic layer 160 formed thereon and a function of controlling a fine structure, such as a particle diameter, and is a layer serving as a foundation base of the granular structure. Ru takes an hcp structure like Co, and a lattice space of the crystal is similar to that of Co, and thus magnetic particles with Co as a main component can be oriented in good condition. Therefore, as crystal orientation of the ground layer 150 is higher, crystal orientation of the granular magnetic layer 160 can be improved. Also, by making the grain diameter of the ground layer 150 finer, the grain particle of the granular magnetic layer can be made finer. As a material of the ground layer 150, Ru is typical, but a metal such as Cr or Co or an oxide can be added. The film thickness of the ground layer 150 can be on the order of 5 to 40 nm, for example.

Also, the ground layer 150 may be made to have a two-layer structure by changing a gas pressure at the time of sputtering. Specifically, if the gas pressure of Ar when an upper layer side of the ground layer 150 is formed is made higher than that when a lower layer side is formed, the grain diameter of the grain particles can be made finer while the crystal orientation of the upper granular magnetic layer 160 is kept in an excellent state.

The granular magnetic layer 160 has a granular structure in a columnar shape in which a non-magnetic substance having an oxide as a main component is subjected to segregation around magnetic particles of a ferromagnetic body having a Co—Pt-type alloy as a main component. For example, by using a target obtained by mixing a CoCrPt-type alloy with $SiO_2$, $TiO_2$, or the like to form a film, $SiO_2$, $TiO_2$, or the like, which is a non-magnetic substance, is subjected to segregation around the magnetic particles (grains) formed of CoCrPt-type alloy to form a grain boundary, thereby forming a granular structure with magnetic particles growing in a columnar shape.

Note that the substances used for the granular magnetic layer 160 described above are merely an example and are not restrictive. As a CoCrPt alloy, one or more types of B, Ta, Cu, Ru, and others may be added to CoCrPt. Also, as a non-magnetic substance for forming a grain boundary, for example, an oxide can be used, such as silicon oxide ($SiO_2$), titanium oxide ($TiO_2$), chromic oxide ($Cr_2O_3$), zircon oxide ($ZrO_2$), tantalum oxide ($Ta_2O_5$), or cobalt oxide (CoO or $Co_3O_4$). Furthermore, not only one type of oxide but two or more types of oxide can be combined for use.

The dividing layer 170 is provided between the granular magnetic layer 160 and the auxiliary recording layer 180, and has an action of adjusting the strength of exchange coupling between these layers. With this, the strength of the magnetic interaction between the granular magnetic layer 160 and the auxiliary recording layer 180 and between adjacent magnetic particles in the granular magnetic layer 160 can be adjusted. Thus, while magneto-static values relating to resistance to thermal fluctuation, such as Hc and Hn, are kept, the recording and replaying characteristic, such as the overwrite characteristic and the SNR characteristic, can be improved.

The dividing layer 170 is preferably a layer having Ru or Co with an hcp structure as a main component in order not to degrade inheritance of crystal orientation. As a Ru-type material, in addition to Ru, a substance obtained by adding another metal element or oxygen or an oxide to Ru can be used. Also, as a Co-type material, a CoCr alloy or the like can be used. Specifically, Ru, RuCr, RuCo, Ru—$SiO_2$, Ru—$WO_3$, Ru—$TiO_2$, CoCr, CoCr—$SiO_2$, CoCr—$TiO_2$, or the like can be used. Note that although a non-magnetic material is normally used for the dividing layer 170, it may have a weak magnetism. Furthermore, to obtain an excellent exchange coupling strength, the film thickness of the dividing layer 170 is preferably within a range of 0.2 to 1.0 nm.

Still further, an action to the structure of the dividing layer 170 is to promote separation of crystal grains of the upper auxiliary recording layer 180. For example, even when the upper layer is made of a material without containing a non-magnetic substance, the grain boundary of the magnetic crystal grains can be clarified.

The auxiliary recording layer 180 is a magnetic layer magnetically approximately continuous in an in-plane direction on a main surface of the base. Since the auxiliary recording layer 180 has a magnetic interaction (exchange coupling) with respect to the granular magnetic layer 160, a magneto-static characteristic, such as a coersive force Hc and an inverted-magnetic-domain nucleation magnetic field Hn, can be adjusted, thereby having an object of improving the resistance to thermal fluctuation, an OW characteristic, and SNR. As a material of the auxiliary recording layer 180, a CoCrPt alloy can be used. Furthermore, an additive, such as B, Ta, or Cu, can be added. Specifically, CoCrPt, CoCrPtB, CoCrPtTa, CoCrPtCu, CoCrPtCuB, and others can be used. Also, the film thickness of the auxiliary recording layer 180 can be 3 to 10 nm, for example.

Note that "magnetically continuous" means that magnetism continues without interruption. "Approximately continuous" means that the auxiliary recording layer 180 is not necessarily a single magnet when observed as a whole and may have magnetism partially discontinuous. That is, the auxiliary recording layer 180 may have magnetism continuous across (so as to cover) an aggregation of a plurality of magnetic particles. As long as this condition is satisfied, the auxiliary recording layer 180 may have a structure with segregation of Cr, for example.

The protective layer 190 is a layer for protecting the perpendicular magnetic disk 100 from a shock of a magnetic head. The protective layer 190 can be formed by forming a film containing carbon by CVD. In general, since a carbon film formed by CVD has an improved film hardness compared with the one formed by sputtering, the carbon film can more effective protect the perpendicular magnetic disk 100 from a shock from the magnetic head and thus is suitable. The film thickness of the protective layer 190 can be 2 to 6 nm, for example.

The lubricating layer 200 is formed in order to prevent damage on the protective layer 190 when the magnetic head makes contact with the surface of the perpendicular magnetic disk 100. For example, a film can be formed by coating with PFPE (perfluoropolyether) by dip coating. The film thickness of the lubricating layer 200 can be 0.5 to 2.0 nm, for example.

First Example

To confirm effectiveness of the above-structured perpendicular magnetic disk 100, description is made by using the following examples and comparative examples.

As an example, on the base 110, by using a vacuumed film forming device, the adhesion layer 120 to the auxiliary recording layer 132 were sequentially formed in an Ar atmosphere by DC magnetron sputtering. Note that an Ar gas pressure at the time of film formation is 0.6 Pa unless otherwise specified. As for the adhesive layer 120, Cr-50Ti of 10 nm was formed. As for the soft magnetic layer 130, 92(40Fe-60Co)-3Ta-5Zr of 20 nm was formed above and below a Ru layer of 0.7 nm. As for the amorphous alloy layer 138, 50Ni-50Ta of 2.0 nm was formed. The first preliminary ground layer 142 was formed by using Ti with various thicknesses as described further below. As for the second preliminary ground layer 144, Ni-5W of 8 nm was formed. As for the ground layer 150, Ru of 10 nm was formed at 0.6 Pa, and then Ru of 10 nm was formed thereon at 5 Pa. As for the granular magnetic layer 160, 90(70Co-10Cr-20Pt)-10($Cr_2O_3$) of 2 nm was formed at 3 Pa, and then 90(72Co-10Cr-18Pt)-5($SiO_2$)-5($TiO_2$) of 12 nm was further formed thereon at 3 Pa. As for the dividing layer 170, Ru of 0.3 nm was formed. As for the auxiliary recording layer 180, 62Co-18Cr-15Pt-5B of 6 nm was formed. As for the protective layer 190, $C_2H_4$ was used to form a film of 4.0 nm by CVD, and its surface layer is subjected to nitriding. As for the lubricating layer 200, PFPE was used to form a film of 1 nm by dip coating.

FIG. 2 is a drawing that depicts the film thickness of Ti and an X-ray diffraction strength. As depicted in the drawing, in a Ti thin film, an X-ray diffraction peak of Ti (002 surface) can be observed at 5 nm or larger (near 36.5 to 37 degrees). From this, it can be found that crystallization of Ti proceeds when the thickness exceeds 5 nm and Ti is in a microcrystal form with 5 nm or smaller.

FIG. 3 is a drawing that depicts a relation between the film thickness of the first preliminary ground layer and Δθ50 and SNR of the ground layer. Here, the amorphous ground layer 150 was set as 50Ni-50Ta and the second preliminary ground layer 144 was set as Ni-5W, and the material of the first preliminary ground layer was changed as Ti (Examples 1-1 to 1-5, Example 3, and Example 4), 55Co—Cr40-5AL (Comparative Example 1-1 to Comparative Example 1-4), and 55Co—Cr40-5Cu (Comparative Example 2-1 to Comparative Example 2-4). Also, an example without having the first preliminary ground layer 142 is taken as Comparative Example 3, and an example without having the amorphous alloy layer 138 is taken as Comparative Example 4.

As can be seen from FIG. 3, in the structures of the examples, as the film thickness of the first preliminary ground layer 142 is thicker, Δθ50 is improved (lessened). On the other hand, in the structures of Comparative Examples 1-1 to 1-4 and Comparative Examples 2-1 to 2-4, as the film thickness of the first preliminary ground layer 142 is thicker, Δθ50 is degraded. As such, although Co is an element having an hcp structure like Ti, their behaviors are different as described above, and therefore it can be found that not every hcp-type material will suffice. Therefore, it can be confirmed that Ti is better than any other materials.

Furthermore, according to observations of behaviors in the examples, as the film thickness is thicker, Δθ50 is improved. From this, it can be found that crystal orientation is improved as crystallization of the first preliminary ground layer 142 is improved.

Also, with attention to the SNR in FIG. 3, the SNR is improved in Examples 1-1 to 1-4 in which the film thickness of the first preliminary ground layer 142 is 5 nm or smaller, compared with Comparative Example 3 with a film thickness of 0 nm. On the other hand, it can be found that the SNR is rapidly decreased in Example 1-5, in which the film thickness of the first preliminary ground layer 142 is thicker than 5 nm, to be lower than that of Comparative Example 3. The reason for this can be such that the first preliminary ground layer 142 grows from microcrystals to be crystalline when the film thickness exceeds 5 nm and the crystal grains of the second preliminary ground layer 144 grow too much to become overgrown. And, in Comparative Examples 1-1 to 1-4 and Comparative Examples 2-1 to 2-4, the SNR tends to be decreased as the film thickness of the first preliminary ground layer is thicker. These correspond to the tendency and behavior of Δθ50.

From these, it has been confirmed that the SNR can be improved by providing the first preliminary ground layer 142 made of Ti below the second preliminary ground layer 144 made of a Ni-type alloy and making a film thickness equal to or smaller than 5 nm for causing microcrystals.

In the foregoing, with reference to the attached drawings, preferred embodiments of the present invention have been described. However, needless to say, the present invention is not meant to be restricted by such embodiments. It is obvious that a person skilled in the art can conceive various modification examples and corrected examples within a category described in the scope of claims for patent. As a matter of course, it is understood that these also belong to the technical scope of the present invention.

INDUSTRIAL APPLICABILITY

The present invention can be used as a perpendicular magnetic disk implemented on an HDD of a perpendicular magnetic recording type or the like, and its manufacturing method.

DESCRIPTION OF REFERENCE NUMERALS

100 . . . perpendicular magnetic disk
110 . . . base
120 . . . adhesion layer
130 . . . soft magnetic layer
138 . . . amorphous alloy layer
140 . . . preliminary ground layer
142 . . . first preliminary ground layer
144 . . . second preliminarily ground layer
150 . . . ground layer
160 . . . granular magnetic layer
170 . . . dividing layer
180 . . . auxiliary recording layer
190 . . . protective layer
200 . . . lubricating layer

The invention claimed is:

1. A perpendicular magnetic disk comprising:
   a base,
   a soft magnetic layer formed on the base and showing a soft magnetic characteristic,
   an amorphous alloy layer formed on the soft magnetic layer,
   a preliminary ground layer provided on the amorphous alloy layer,
   a ground layer formed of Ru or an Ru alloy having an hcp crystal structure provided on the preliminary ground layer, and
   a granular magnetic layer provided on the ground layer,
   wherein the amorphous alloy layer contains Ta,
   wherein the amorphous alloy layer contains 30 at % or more Ta, and
   wherein the preliminary ground layer includes a first preliminary ground layer formed of Ti or a Ti alloy of microcrystals and a second preliminary ground layer formed of a Ni-type alloy of an fcc crystal structure.

2. The perpendicular magnetic disk according to claim 1, wherein the first preliminary ground layer has a film thickness equal to or larger than 1 nm and equal to or smaller than 5 nm.

3. The perpendicular magnetic disk according to claim 1, wherein the soft magnetic layer comprises a plurality of layers, including layers with one of cobalt alloy and FeCo alloy and a spacer layer of Ru, and said amorphous alloy layer is in direct contact with a soft magnetic layer.

4. The perpendicular magnetic disk according to claim 1, wherein the amorphous alloy layer is between the soft magnetic layer and the preliminary ground layer and is operative to ensure flatness of a surface.

5. The perpendicular magnetic disk according to claim 1, further comprising an adhesive layer disposed between the base and the soft magnetic layer.

6. The perpendicular magnetic disk according to claim 1, wherein said amorphous alloy layer comprises at least one of NiTa and CrTa.

7. The perpendicular magnetic disk according to claim 1, wherein said amorphous alloy layer has a composition different from said soft magnetic layer.

8. The perpendicular magnetic disk according to claim 1, wherein the soft magnetic layer is more than 21 nm and less than 100 nm thick and is thicker than the amorphous alloy layer.

9. The perpendicular magnetic disk according to 1, wherein the soft magnetic layer is more than 21 nm and less than 100 nm thick and the amorphous alloy layer is 2-8 nm thick.

10. The perpendicular magnetic disk according to claim 1, wherein the soft magnetic layer comprises a plurality of layers, including at least a first layer and a second layer and a spacer layer of Ru therebetween to provide antiferromagnetic exchange coupling between said first and second layers.

* * * * *